(12) United States Patent
Abe

(10) Patent No.: US 10,944,887 B2
(45) Date of Patent: Mar. 9, 2021

(54) APPARATUS FOR CONTROLLING A DISPLAY OF A DISPLAY SCREEN

(71) Applicant: FUJI XEROX CO., LTD., Tokyo (JP)

(72) Inventor: Masaki Abe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/541,173

(22) Filed: Aug. 15, 2019

(65) Prior Publication Data
US 2020/0304684 A1    Sep. 24, 2020

(30) Foreign Application Priority Data
Mar. 20, 2019  (JP) ............................. JP2019-052965

(51) Int. Cl.
| | |
|---|---|
| *H04N 1/44* | (2006.01) |
| *G06F 3/0484* | (2013.01) |
| *H04N 1/00* | (2006.01) |
| *G06F 3/0482* | (2013.01) |

(52) U.S. Cl.
CPC ....... *H04N 1/4433* (2013.01); *G06F 3/04845* (2013.01); *H04N 1/00411* (2013.01); *H04N 1/00514* (2013.01); *G06F 3/0482* (2013.01)

(58) Field of Classification Search
None
See application file for complete search history.

(56) References Cited

U.S. PATENT DOCUMENTS

| | | | | |
|---|---|---|---|---|
| 2013/0074008 | A1* | 3/2013 | Umezawa | G03G 15/502 715/810 |
| 2015/0301700 | A1* | 10/2015 | Komori | G06F 9/445 715/765 |
| 2016/0295033 | A1* | 10/2016 | Hirasawa | H04N 1/0097 |
| 2020/0014807 | A1* | 1/2020 | Kurumasa | H04N 1/00424 |

FOREIGN PATENT DOCUMENTS

| | | |
|---|---|---|
| JP | 2009075451 | 4/2009 |
| JP | 2014128009 | 7/2014 |

* cited by examiner

*Primary Examiner* — Thomas D Lee
(74) *Attorney, Agent, or Firm* — JCIPRNET

(57) ABSTRACT

An information processing apparatus that performs display control for receiving edit of a display screen on which at least one image representing a function is displayed and causing a user display screen edited by an authorized user to be displayed on an operation display unit includes a first controller that, in a case where the user display screen is changed by an entity other than the user, performs display control for displaying a receiving screen that includes an image of a display screen after the change and a selection part for selecting whether to permit or prohibit shift to the display screen after the change and receives user's selection; and a second controller that, in a case where the user selects prohibition of shift to the display screen after the change, performs display control for shifting the receiving screen to an edit screen for editing the display screen after the change.

18 Claims, 16 Drawing Sheets

FIG. 2
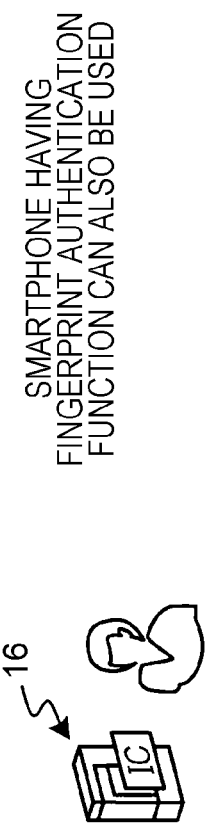
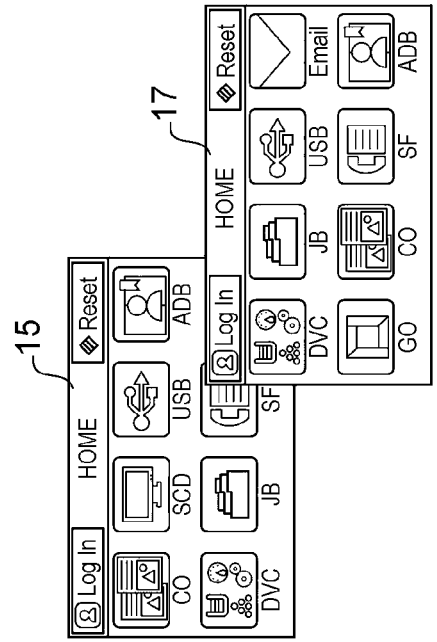
SMARTPHONE HAVING FINGERPRINT AUTHENTICATION FUNCTION CAN ALSO BE USED

FIG. 12

| USER | PASSWORD | DISPLAY CUSTOMIZATION | ADDED FUNCTION ID |
|---|---|---|---|
| userA | XXXX | CUSTOMIZED | 0006, 0007 |
| userB | YYYY | NOT CUSTOMIZED | 0005, 0006, 0007 |

FIG. 13

| FUNCTION ID | FUNCTION NAME | DISPLAY POSITION | ACCESS AUTHORITY | |
| | | | userA | userB |
|---|---|---|---|---|
| 0006 | Cloud Print | 1 | AUTHORIZED | NOT AUTHORIZED |
| 0006 | Server Fax | 0 | NOT AUTHORIZED | AUTHORIZED |
| 0007 | Scan To Box | 3 | AUTHORIZED | AUTHORIZED |

FIG. 14

```xml
<?xml version="1.0" encoding="utf-8"?>
<displaySetting>
    <icon>
        <position>1</position>
        <service>CO</service>
        <fix>true</fix>
    </icon>
    <icon>
        <position>2</position>
        <service>Fax</service>
        <fix>false</fix>
    </icon>
</displaySetting>
</xml>
```

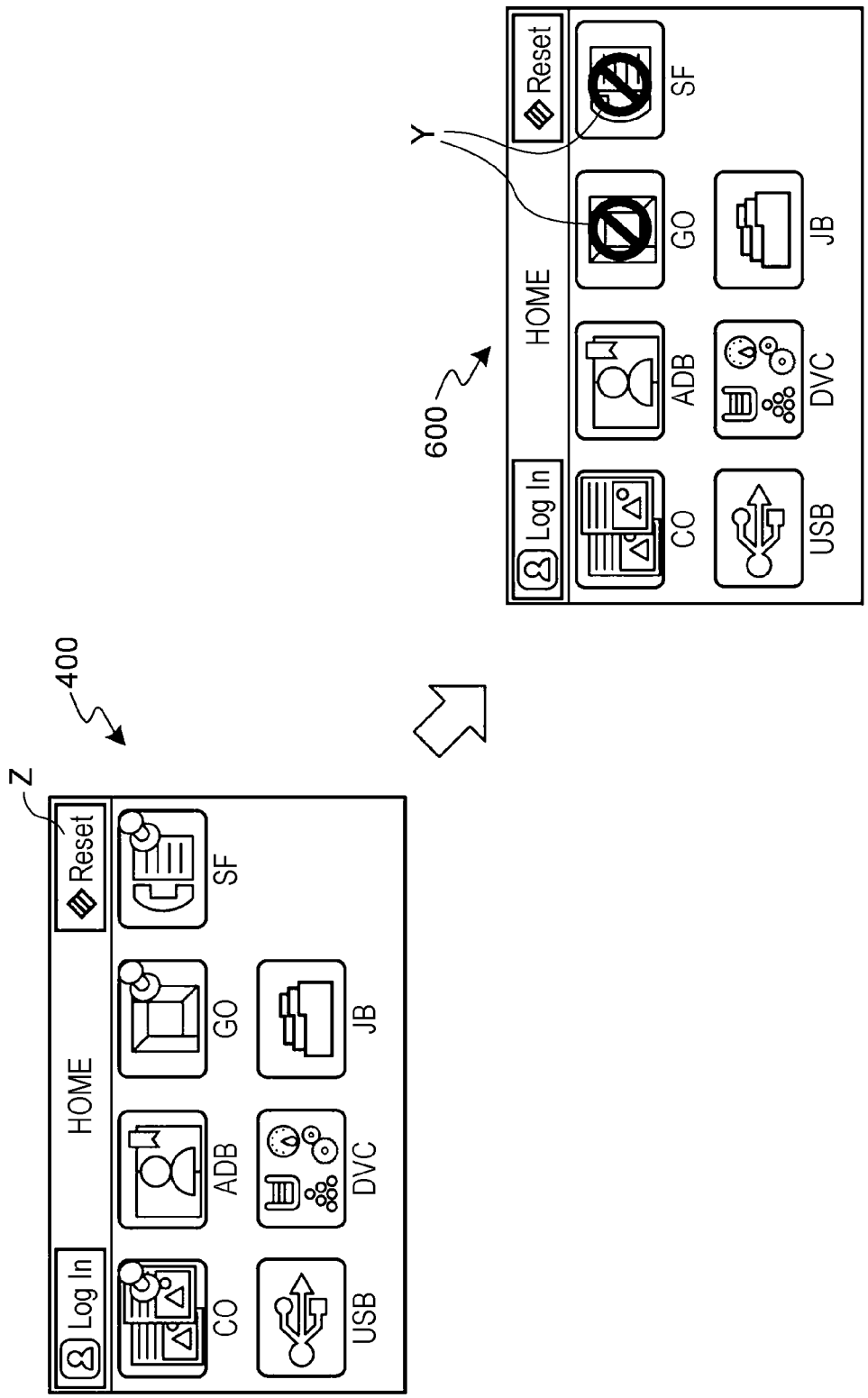

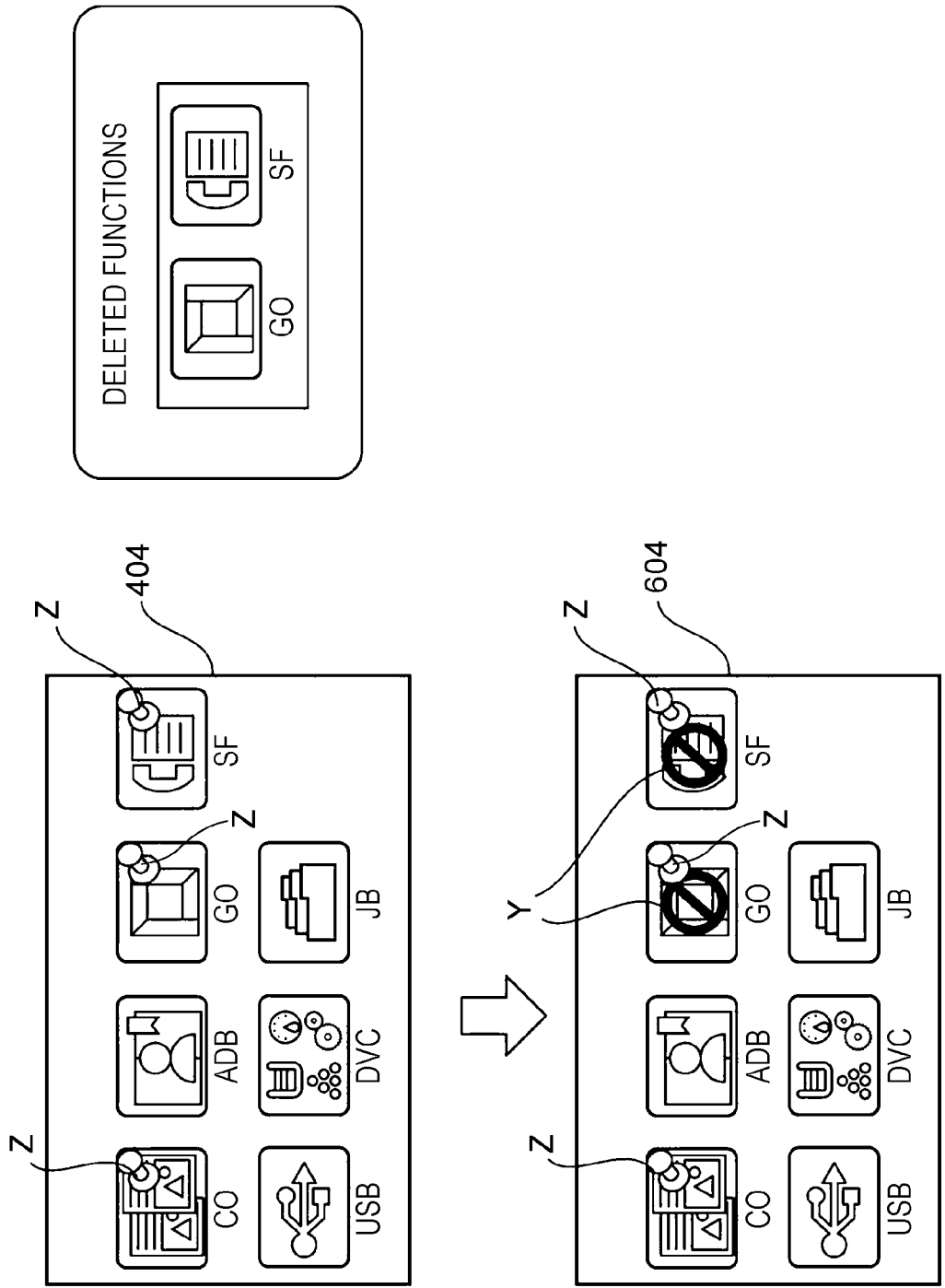

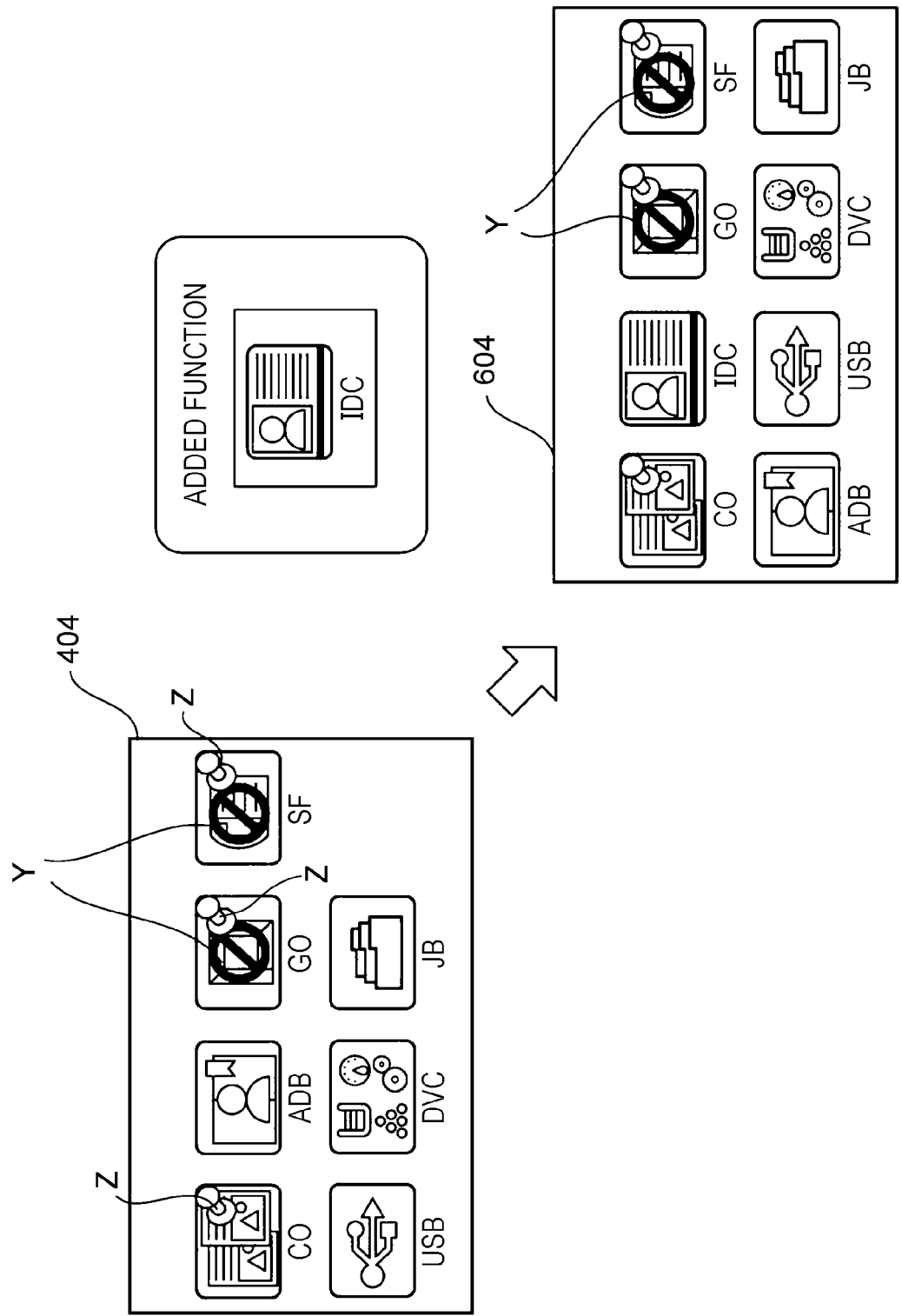

APPARATUS FOR CONTROLLING A DISPLAY OF A DISPLAY SCREEN

CROSS-REFERENCE TO RELATED APPLICATIONS

This application is based on and claims priority under 35 USC 119 from Japanese Patent Application No. 2019-052965 filed Mar. 20, 2019.

BACKGROUND

(i) Technical Field

The present disclosure relates to an information processing apparatus and a non-transitory computer readable medium.

(ii) Related Art

Japanese Unexamined Patent Application Publication No. 2014-128009 discloses an image processing system including a screen customizing unit that customizes a screen for each user, a new user service adding unit that adds a new user service to the image processing system, and an addition necessity selecting unit that selects whether or not to add the added new user service to a customized screen.

SUMMARY

In a system that provides a service function (hereinafter referred to as a "function"), a display screen for displaying the function is displayed on an operation display unit operated by a user. Each function is represented by an image such as an icon. Hereinafter, an image representing a function is referred to as an "icon" although the icon is an example of an image. When a user, for example, touches an icon on the display screen, a function is selected, and the selected function activates. Initial settings of the display screen such as kinds of functions and display positions of icons are determined on a system side.

A user can set a user's display screen by editing the display screen on an edit screen. The user selects a function to be used from among available functions and causes an icon of the selected function to be displayed on the user's display screen. Before user authentication, a display screen set by the system is displayed. After user authentication, the user's display screen is displayed.

A system administrator can make a change to functions available to a user such as addition of a function, deletion of a function, and revision of a user's authority over a function. When the administrator changes an available function, a new display screen reflecting the administrator's change is generated.

Aspects of non-limiting embodiments of the present disclosure relate to providing an information processing apparatus and a non-transitory computer readable medium that can reduce user's trouble in getting to an edit screen in a case where a user's display screen is changed by an entity other than the user as compared with a configuration in which an edit screen is opened from a display screen after the change.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus that performs display control for receiving edit of a display screen on which at least one image representing a function is displayed and causing a user display screen edited by an authorized user to be displayed on an operation display unit, including: a first controller that, in a case where the user display screen is changed by an entity other than the user, performs display control for displaying a receiving screen that includes an image of a display screen after the change and a selection part for selecting whether to permit or prohibit shift to the display screen after the change and receives user's selection; and a second controller that, in a case where the user selects prohibition of shift to the display screen after the change, performs display control for shifting the receiving screen to an edit screen for editing the display screen after the change.

BRIEF DESCRIPTION OF THE DRAWINGS

An exemplary embodiment of the present disclosure will be described in detail based on the following figures, wherein:

FIG. 2 is a schematic view illustrating an example of a configuration in a case where an image forming apparatus is used as the information processing apparatus;

FIG. 12 illustrates an example of a user management table;

FIG. 13 illustrates an example of a function management table;

FIG. 14 illustrates an example of a data structure of screen information;

FIG. 15 is a schematic view illustrating an example in which an icon layout is not changed;

FIG. 16 is a schematic view illustrating an example of a method for displaying a deleted icon; and FIG. 17 is a schematic view illustrating an example of a method for displaying an added icon.

DETAILED DESCRIPTION

An example of an exemplary embodiment of the present disclosure is described in detail below with reference to the drawings.

Information Processing Apparatus

First, a configuration of an information processing apparatus is described.

Figure 1:
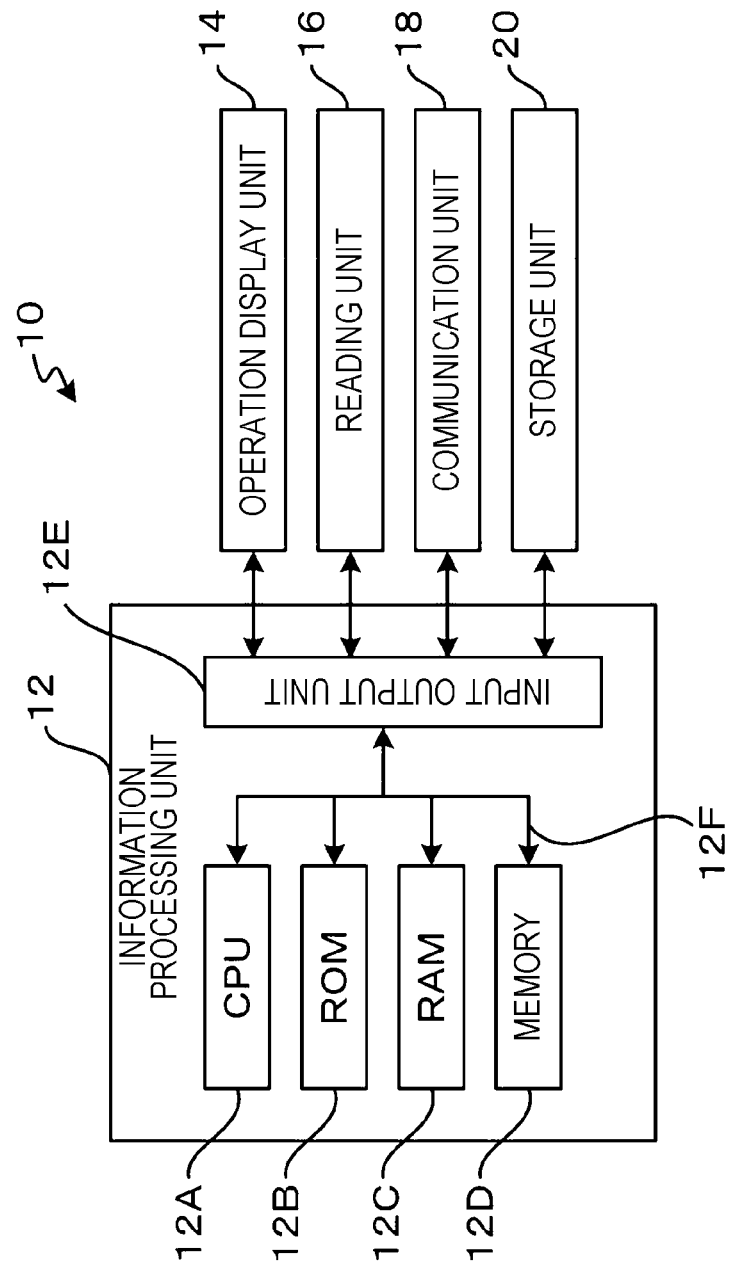
FIG. 1 is a block diagram illustrating an example of an electric configuration of an information processing apparatus according to an exemplary embodiment of the present disclosure.

FIG. 1 is a block diagram illustrating an example of an electric configuration of the information processing apparatus according to the exemplary embodiment of the present disclosure. As illustrated in FIG. 1, an information processing apparatus 10 includes an information processing unit 12 that is a computer that performs control of the whole apparatus and various kinds of arithmetic processing. The information processing unit 12 includes a CPU 12A, a ROM 12B in which various kinds of programs are stored, a RAM 12C used as a work area during execution of a program, a non-volatile memory 12D, and an input output unit 12E. The CPU 12A, the ROM 12B, the RAM 12C, the memory 12D, and the input output unit 12E are connected through a bus 12F.

The information processing apparatus 10 includes an operation display unit 14, a reading unit 16, a communication unit 18, and a storage unit 20. The operation display unit 14 is an interface that displays various kinds of information for a user and receives a user's operation. The reading unit 16 is a device, such as a scanner, that reads information recorded on a medium. The communication unit 18 is an interface for communication with an external apparatus. The storage unit 20 is an external storage device such as a hard disk. The operation display unit 14, the reading unit 16, the communication unit 18, and the storage unit 20 are connected to the input output unit 12E. The information processing unit 12 controls each unit by exchanging information with the unit.

In the present exemplary embodiment, a control program of "home screen display processing" that will be described later is stored in the ROM 12B of the information processing unit 12. Various kinds of management tables that will be described later are stored in the storage unit 20. Various kinds of programs and various kinds of data may be stored in another storage device provided inside or outside the apparatus or may be recorded in a recording medium such as a CD-ROM. Alternatively, the various kinds of programs and various kinds of data may be acquired through communication.

In the present exemplary embodiment, an image forming apparatus having plural functions such as a copy function, a print function, a scan function, and a facsimile function are used as the information processing apparatus 10. FIG. 2 is a schematic view illustrating an example of a configuration in a case where an image forming apparatus is used as the information processing apparatus. In the example illustrated in FIG. 2, the image forming apparatus includes an operation panel as the operation display unit 14 and includes an IC card reader as the reading unit 16.

The operation panel includes a touch panel display and various kinds of buttons. Various kinds of screens such as home screens 15 and 17 are displayed on the touch panel display. The home screen is a screen displayed after authentication or after a button for selecting the home screen is pressed, and icons of plural functions are displayed on the home screen. The home screen is an example of a display screen. The IC card reader is a device that reads information from an IC card.

The IC card reader is used for authentication using a card. In authentication using a card, information recorded on an IC card of a user is read by the IC card reader. In a case where the read information matches predetermined authentication information, the user is permitted to use the image forming apparatus.

Customization of Home Screen

In the present exemplary embodiment, authentication information is given to a user in advance. The authentication information is, for example, a user ID and a password for identifying the user. The information processing apparatus 10 authenticates a user and permits user's use of the information processing apparatus 10. Hereinafter, a user's procedure to obtain permission from the information processing apparatus 10 is referred to as "login", and a state in which the user has been given permission is referred to as a "login state".

Next, various kinds of screens displayed on the operation display unit 14 are described.

Figure 3:
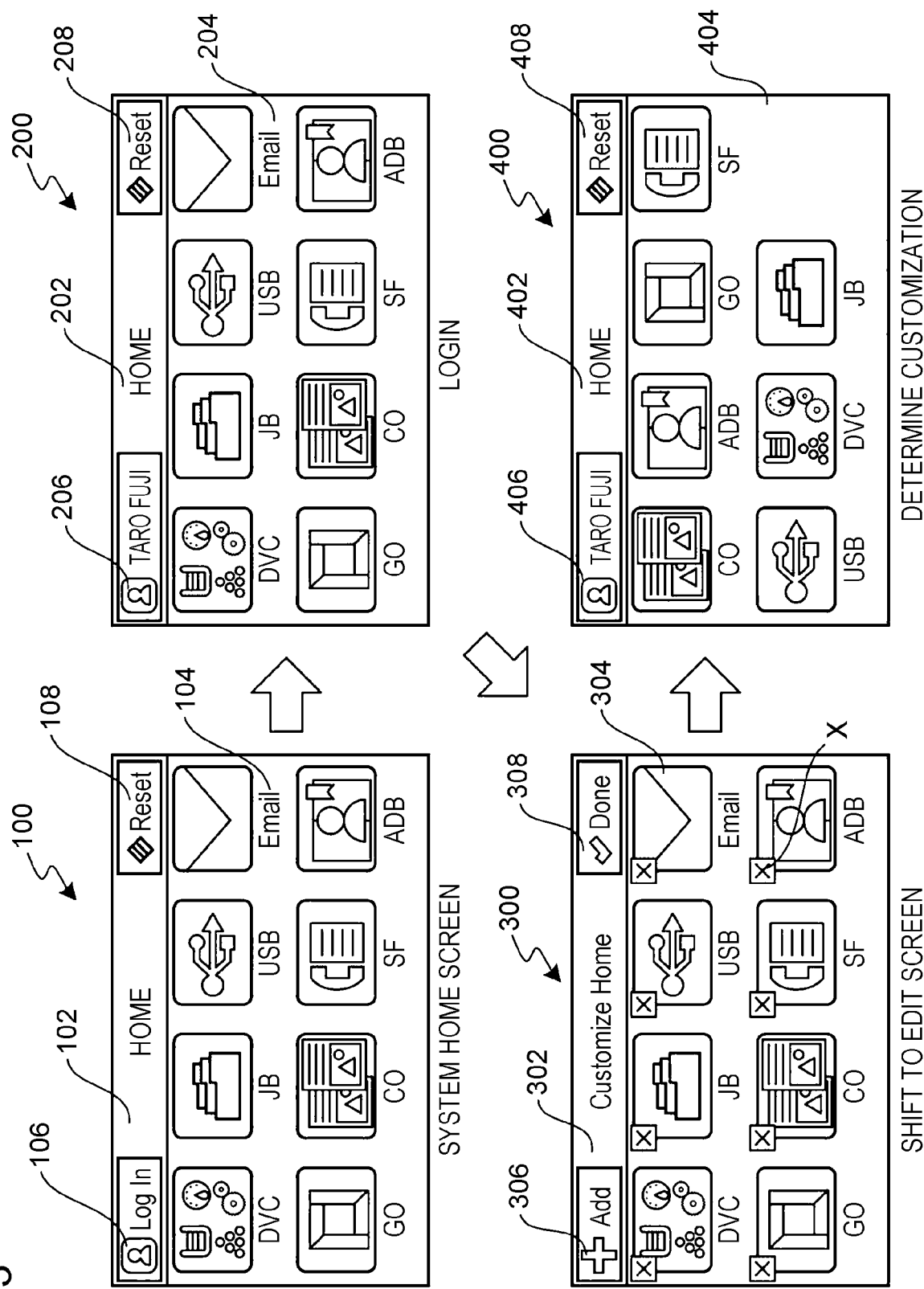
FIG. 3 illustrates shift of a screen from a state before login to determination of customization.

FIG. 3 illustrates shift of screens from a state before login to determination of customization.

Before start of user's login, a system home screen 100 is displayed on the operation display unit 14. The system home screen 100 is a standby screen. Screen information for displaying the system home screen 100 is prepared in advance on the system side. The system home screen 100 is different from a "user home screen" that will be described later and is not a home screen unique to a user.

The system home screen 100 includes a bar 102 and a body 104. An icon representing a function is displayed on the body 104. On the bar 102, a login button 106 and a reset button 108 are displayed. The login button 106 is a button for start of login. The reset button 108 is a button for resetting contents of an operation performed on the home screen. When a user presses the login button 106, login starts.

For example, the information processing apparatus 10 displays a login screen for a user and receives entry of authentication information from the user. In a case where the entered information matches predetermined authentication information, the user is permitted to use the information processing apparatus 10. As described above, authentication using a card may be performed.

In a login state, a home screen 200 after login is displayed on the operation display unit 14. The home screen 200 after login includes a bar 202 and a body 204. On the body 204, an icon representing a function is displayed. On the bar 202, user indication 206 and a reset button 208 are displayed. In the login state, for example, a name (Taro Fuji) of the user is displayed as the user indication 206 on the home screen 200.

The user can select an edit function in the login state and customize the home screen. For example, a customization button for shifting to an edit screen 300 for customizing the home screen may be displayed on the home screen 200 after login. When the user presses the customization button, the edit screen 300 is displayed.

The edit screen 300 includes a bar 302 and a body 304. On the body 304, an icon representing a function is displayed. An icon layout of the system home screen 100 is to be edited. A deletion button X for deletion of a function is displayed so as to be superimposed on each icon. In the example illustrated in FIG. 3, the deletion button X is displayed so as to be superimposed on an upper left portion of each icon. When the user presses the deletion button X, an icon of a function is deleted from the home screen.

On the bar 302, an addition button 306 for adding a function and a determination button 308 for determining contents of edit are displayed. When the user presses the addition button 306, a list of available functions is displayed. When the user selects and adds a function which the user wants to use, an icon of the added function is displayed on the home screen.

When the user presses the determination button 308, the edit contents are determined, and a home screen 400 after edit is displayed. The home screen 400 after edit includes a bar 402 and a body 404. On the body 404, an icon representing a function is displayed. On the bar 402, user indication 406 and a reset button 408 are displayed.

When the edit contents are determined, screen information for displaying the home screen 400 after edit is stored in association with the user ID. When the user logs in the system next time, the home screen 400 after edit customized by the user is displayed as a "user home screen". The user home screen is displayed on the basis of the screen information of the home screen 400.

Change of Customized State

In a system in which plural users use the information processing apparatus, an available function and screen information of a customized home screen are managed for each of the users. An administrator of the information processing apparatus can make a change to the contents of the home screen such as addition or a deletion of a function displayed on the home screen. Furthermore, the administrator of the information processing apparatus can make a change to a user's authority of access to a function such as cancellation of an access authority.

In a case where the administrator makes such a change, a "user home screen" cannot be displayed as it is even in a case where the home screen has been customized by the user. The user's customization is invalidated, and a "home screen after the change" reflecting contents of the administrator's change is displayed. That is, the user home screen is changed.

Figure 4:
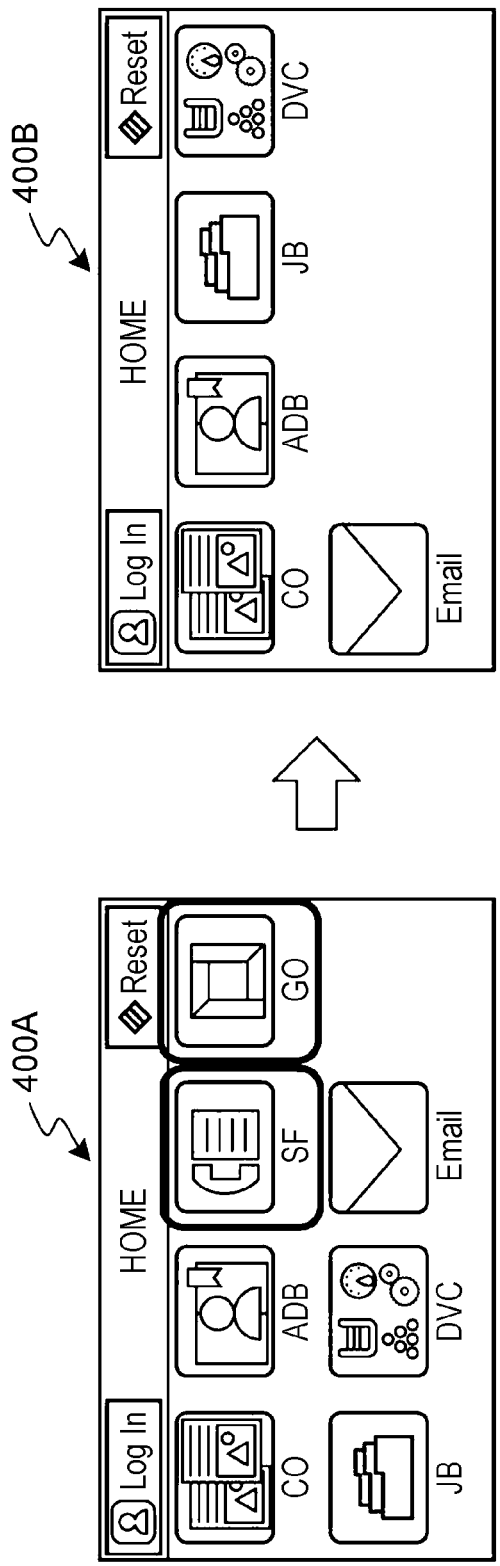
FIG. 4 is a schematic view for explaining an example of a change of a home screen.

FIG. 4 is a schematic view for explaining an example of a change of a home screen. As illustrated in FIG. 4, icons of a function SF and a function GO are displayed on a user home screen 400A. When an administrator deletes the function SF from among the functions displayed on the home screen, the icon of the function SF is deleted from the home screen 400A. Furthermore, the function GO that directly or indirectly uses the function SF also becomes unavailable, and therefore the icon of the function GO is also deleted from the home screen 400A.

On a new home screen 400B reflecting the contents of the change, the icons of the function SF and the function GO are not displayed, and remaining icons are displayed so as to be aligned on a left side. In a case where the remaining icons are displayed so as to be aligned on the left side, which function has become unavailable is unknown. The user sometimes recognizes a function to be used on the basis of a position where the icon is displayed, and therefore if the position where the icon is displayed is changed, user's usability becomes poor.

Figure 5:
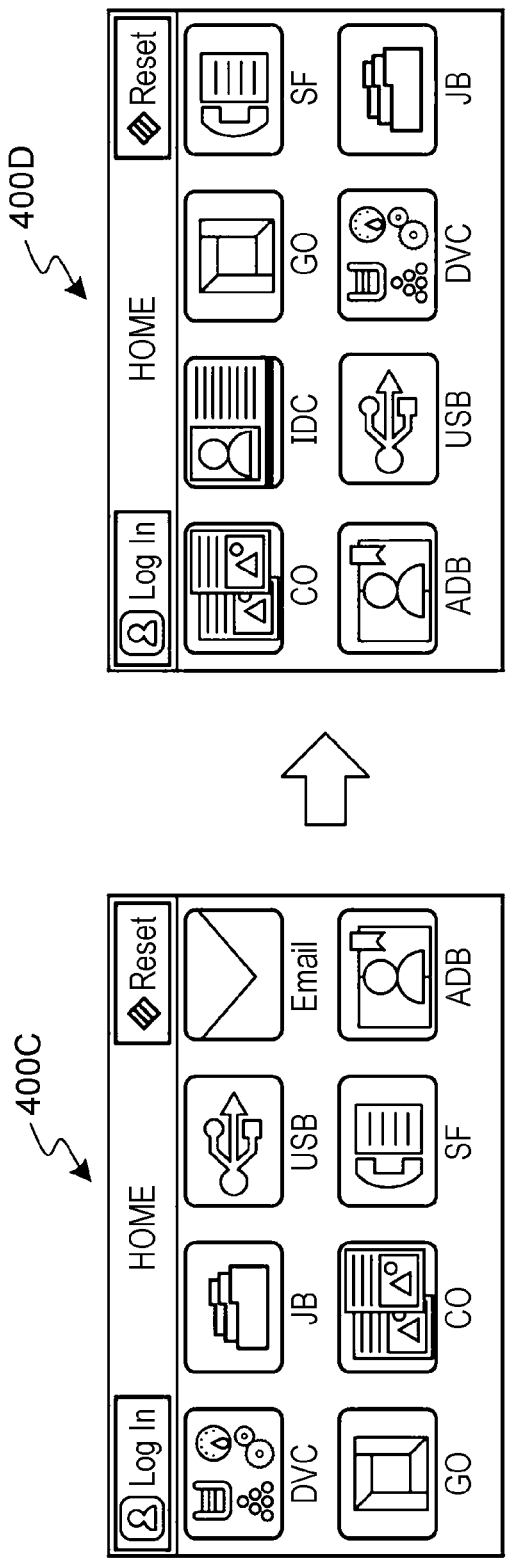
FIG. 5 is a schematic view for explaining another example of a change of a home screen.

FIG. 5 is a schematic view for explaining another example of a change of a home screen. As illustrated in FIG. 5, a layout of icons on a user home screen 400C is changed to a layout of icons on a home screen 400D by an administrator. In a case where a position where an icon is displayed is changed, user's usability becomes poor.

For example, a default layout of icons is set for people having no disabilities. In a case where a physically-challenged user who cannot reach a high place customizes a home screen so that frequently-used icons are disposed in a lower part which can be reached, a change of positions where the icons are displayed makes usability of the home screen poor.

Display of Confirmation Screen

In the present exemplary embodiment, a confirmation screen for allowing a user to confirm a home screen after change is displayed before the home screen after change is displayed after login.

Figure 6:
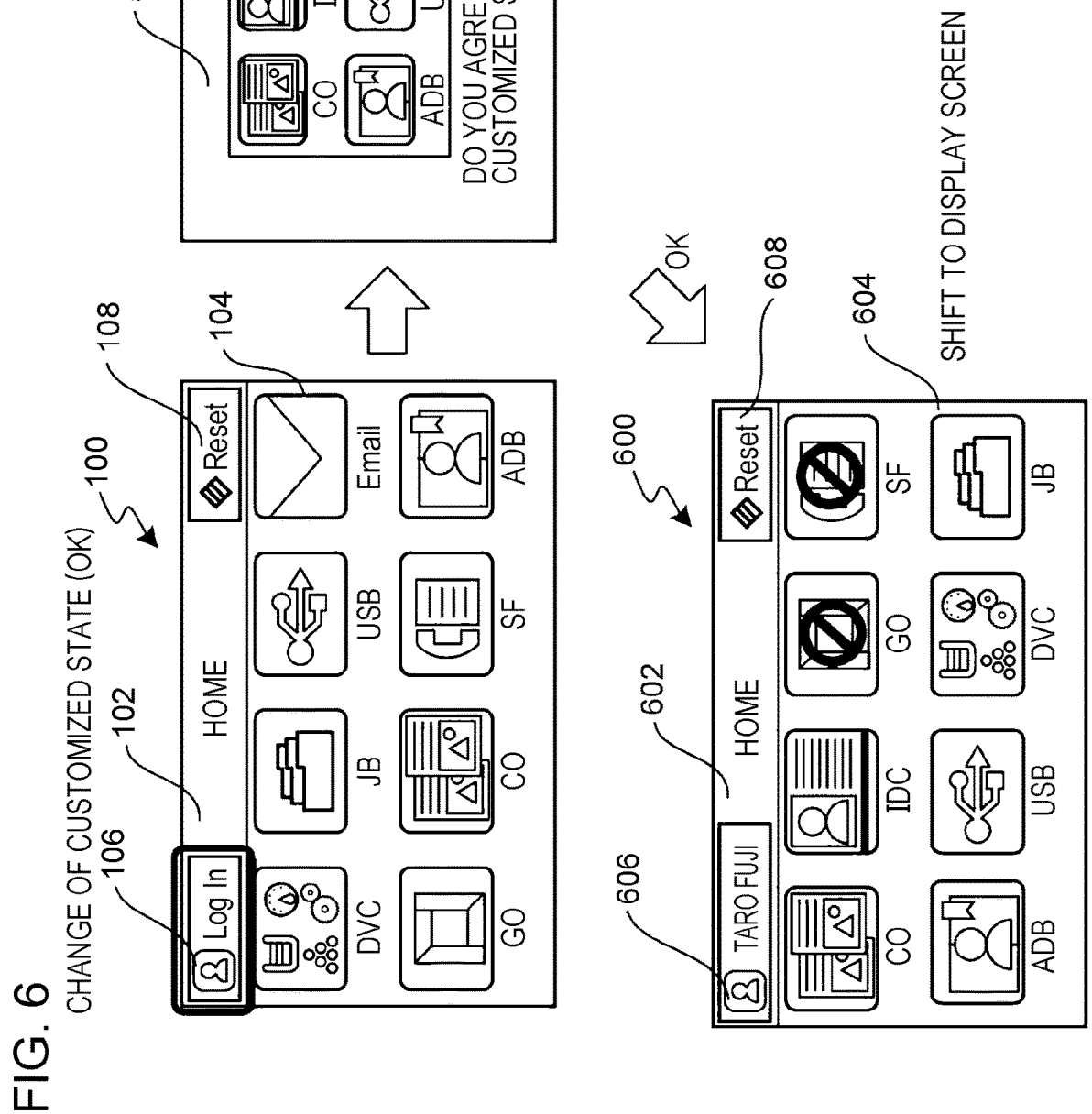
FIG. 6 illustrates an example of how a screen shifts when a user logs in a system in the present exemplary embodiment.
Figure 7:
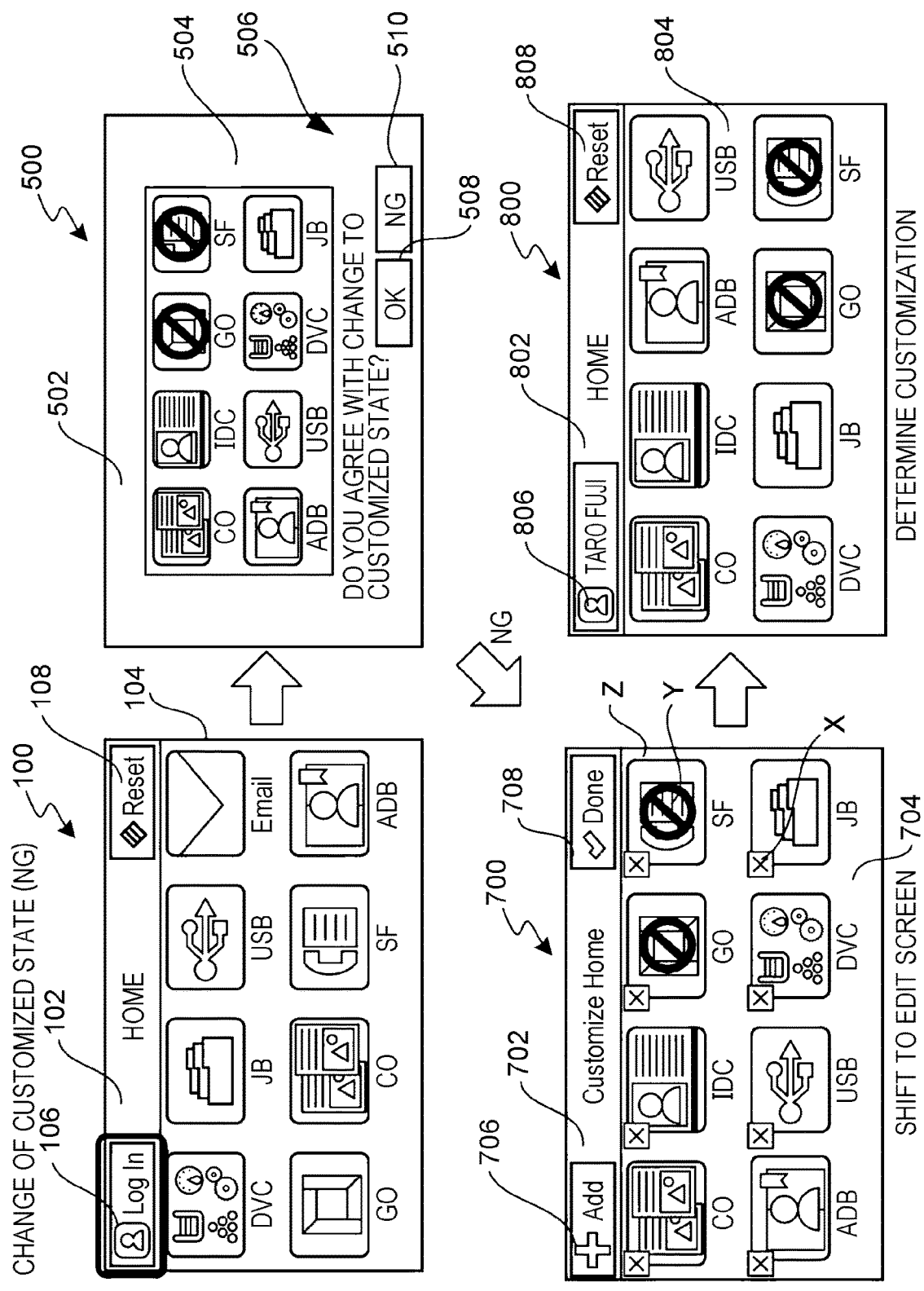
FIG. 7 illustrates an example of how a screen shifts when a user logs in a system in the present exemplary embodiment.

FIGS. 6 and 7 illustrate an example of how a screen shifts when a user logs in a system in the present exemplary embodiment. In the present exemplary embodiment, when a user presses the login button 106 on the system home screen 100, login starts. After login, a confirmation screen 500 for allowing the user to confirm a home screen 600 after change is displayed before the home screen 600 after the change is displayed.

The confirmation screen 500 includes a frame 502, an image 504 of the home screen after the change, a notification 506, a permission button 508 for permitting shift to the home screen after the change, and a prohibition button 510 for prohibiting shift to the home screen after the change.

On the confirmation screen 500, the image 504 of the home screen after the change is displayed in a manner different from the home screen 600 after the change. In the example illustrated in FIGS. 6 and 7, the image 504 is a reduced image of a body 604 of the home screen 600 after the change and is displayed within the frame 502 in a size smaller than the home screen. The frame 502 makes the image 504 noticeable.

The manner in which the image 504 of the home screen after the change is displayed is not limited to the example illustrated in FIGS. 6 and 7, as long as the user can be notified of the change of the user home screen. For example, a screen after change may be displayed on a screen different from a screen that is normally displayed (e.g., may be displayed on a pop-up screen) so that the image 504 is superimposed on the confirmation screen 500. Alternatively, the confirmation screen 500 may be divided into plural regions, and the screen before change and the screen after change may be concurrently displayed so that the image 504 is displayed in one of the divided regions. Furthermore, information explicitly indicating that the home screen after change is being displayed may be displayed.

The user confirms contents of the home screen after the change such as deletion or addition of a function and a display position of an icon on the basis of the image 504. The notification 506 is a message, such as "Do you agree with change to customized state?", notifying the user about the change of the user home screen.

User's selection is received by using the permission button 508 and the prohibition button 510. When the user presses the permission button 508, the home screen 600 after the change is displayed as illustrated in FIG. 6. Meanwhile, when the user presses the prohibition button 510, the edit screen 700 is displayed as illustrated in FIG. 7.

An icon layout on the home screen 600 after the change is to be edited on the edit screen 700. In a case where the user does not want to use the home screen 600 after the change, the edit screen 700 is displayed as a "next screen" just by a user's operation of pressing the prohibition button 510.

The home screen 600 after the change includes a bar 602 and a body 604. On the body 604, an icon representing a function is displayed. On the bar 602, user indication 606 and a reset button 608 are displayed.

The edit screen 700 includes a bar 702 and a body 704. On the body 704, an icon representing a function is displayed. A deletion button for deleting a function is displayed so as to be superimposed on each icon. On the bar 702, an addition button 306 for adding a function and a determination button 308 for determining edit contents are displayed.

When the edit contents are determined, screen information for displaying a home screen 800 after the edit is stored in association with a user ID. The home screen 800 after the edit is displayed as a "user home screen". The home screen 800 after the edit includes a bar 802 including user indication 806 and a reset button 808 and a body 804 on which an icon representing a function is displayed.

Icon Display Rule

Next, an icon display rule is described.

A home screen after change is a user home screen reflecting contents of a change made by an administrator. In the present exemplary embodiment, the following two rules (1) and (2) are set as a method for displaying icons representing functions so that an icon layout customized by a user is not markedly changed. That is, user's usability of the home screen is maintained by preventing the icon layout from being markedly changed.

(1) An icon of a deleted function is displayed in an unavailable manner.

(2) An icon is displayed at a fixed position (hereinafter referred to as "pinned").

Display of Icon of Deleted Function

Next, how an icon of a deleted function is displayed is described.

On the home screen 600 after the change illustrated in FIG. 6, the function GO and the function SF have been deleted from the user home screen 400. The function GO and the function SF are unavailable to the user.

In the present exemplary embodiment, the icon of the deleted function GO and the icon of the function SF are displayed on the home screen 600 after the change. A use prohibition mark Y indicating that the function is unavailable is displayed so as to be superimposed on the icon of the function GO and the icon of the function SF. A function of an icon given the use prohibition mark Y does not activate even in a case where the icon is selected.

Since an icon of a deleted function is displayed, positions where other icons are displayed are not changed. Furthermore, since the icon is given the use prohibition mark Y, a user is explicitly notified that the function is unavailable. The deleted function can be confirmed on the confirmation screen 500 (see FIGS. 6 and 7), the edit screen 700 (see FIG. 7), and the home screen 800 after the edit (see FIG. 7).

The icon of the deleted function may be deleted on the edit screen 700. Furthermore, on the edit screen 700, the icon of the deleted function may be moved to the back by cancelling pinning of the icon of the deleted function (see FIG. 7).

Pinning of Icon

Figure 8:
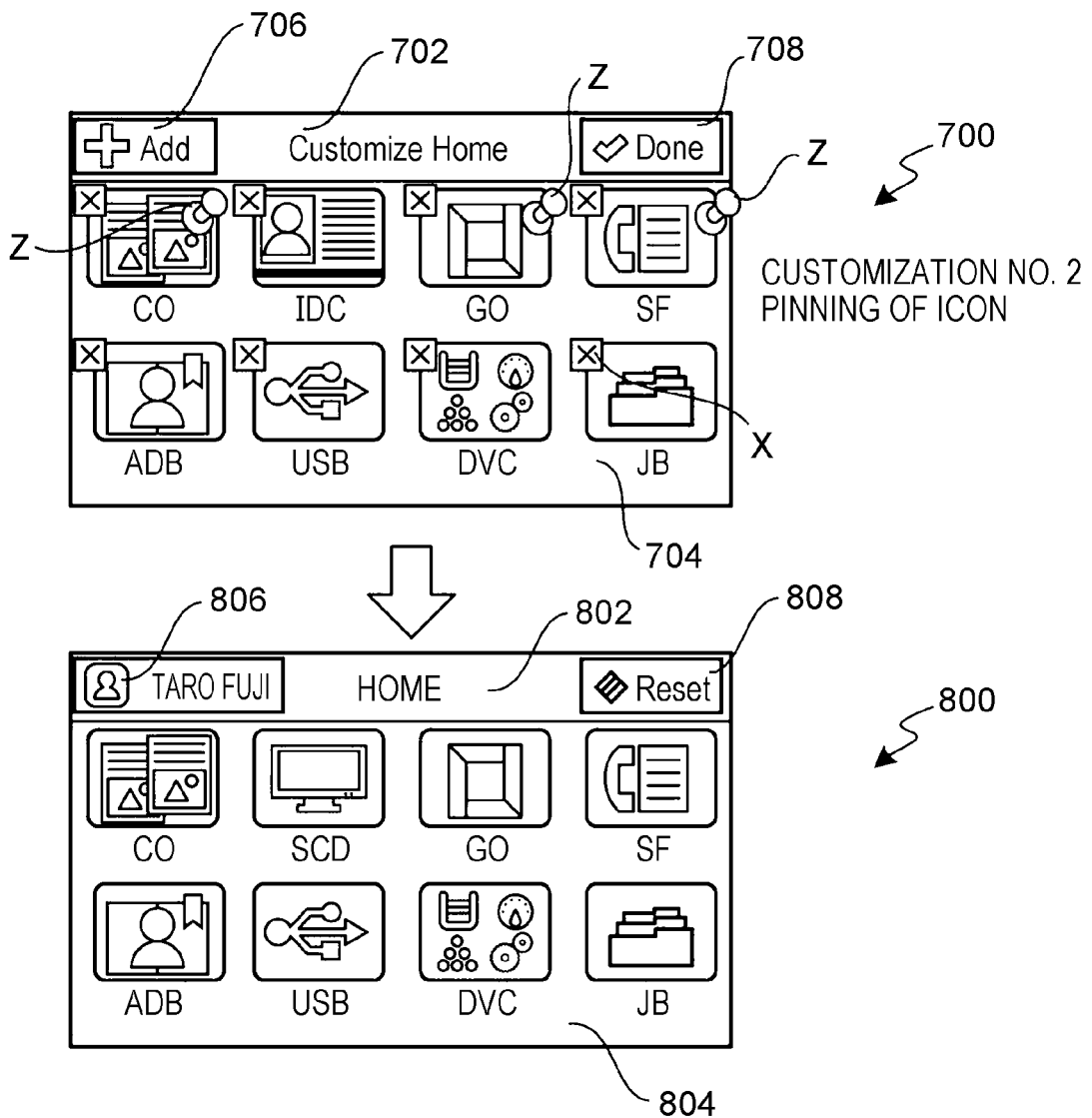
FIG. 8 is a schematic view for explaining pinning of an icon.

Next, pinning of an icon is described. Pinning an icon means fixing a display position of the icon to a predetermined position. FIG. 8 is a schematic view for explaining pinning of an icon. The user can fix a display position of an icon by attaching a pin Z to the icon on the edit screen 700. In this example, an icon of a function CO, the icon of the function GO, and the icon of the function SF are pinned at display positions designated by the user.

Display position of icons are given numbers starting from an upper left icon. The display position of the icon of the function CO is fixed to "No. 1". The display position of the icon of the function GO is fixed to "No. 3". The display position of the icon of the function SF is fixed to "No. 4".

Even in a case where a user home screen is changed as a result of a change of a function made by the administrator, a pinned icon does not move from a fixed display position.

Although an example in which an icon is pinned in accordance with a user's instruction is described, pinning may be prompted on the information processing apparatus side. For example, the information processing apparatus accumulates information concerning a user's use state (a position and a use frequency of an icon) and analyzes the accumulated information. The information processing apparatus displays a candidate of an icon to be pinned at a frequently-used position on the basis of the analysis result.

Home Screen Display Processing

Next, home screen display processing is described.

Various Kinds of Data

First, various kinds of data used for the home screen display processing are described.

The information processing apparatus 10 holds a user management table for managing user information and a function management table for managing function information. In the present exemplary embodiment, the user management table and the function management table are stored in the storage unit 20 of the information processing apparatus 10.

FIG. 12 illustrates an example of the user management table. In the user management table, a password, whether or not display customization has been performed, and an added function are stored as "user information" for each user represented by a user ID. Whether or not display customization has been performed is the presence or absence of screen information for displaying a user home screen.

In a case where display customization has been performed, screen information of a home screen is also stored. The screen information of the home screen includes a function displayed on the home screen, an image of an icon representing the function, and a display position of the icon. The presence or absence of pinning is also included in the screen information of the home screen.

The added function is a function added by the administrator. Each added function is represented by a function ID for identifying the function. In the example illustrated in FIG. 12, the function ID is expressed by a four-digit number such as 0005 or 0006.

FIG. 13 illustrates an example of the function management table. In the function management table, a function name, a display position, and an access authority are stored as "function information" for each function represented by a function ID. A function name is a character string displayed together with an icon. As described above, display positions of icons are numbered in ascending order (e.g., No. 1, No. 2, . . . ) starting from an upper left icon. The access authority indicates, for each user, the presence or absence of an authority of access to a function. The access authority is set by the administrator.

FIG. 14 illustrates an example of a data structure of screen information. The screen information is written in an extensible markup language (XML). This screen information expresses (display number: 1, function: copy, pinning: pinned) and (display number: 2, function: FAX, pinning: not pinned).

Program

Next, a control program of the home screen display processing is described.

The control program of the home screen display processing is read out from the ROM 12C and executed by the CPU 12A of the information processing apparatus 10. The control program of the home screen display processing starts when a user starts login.

Figure 9:
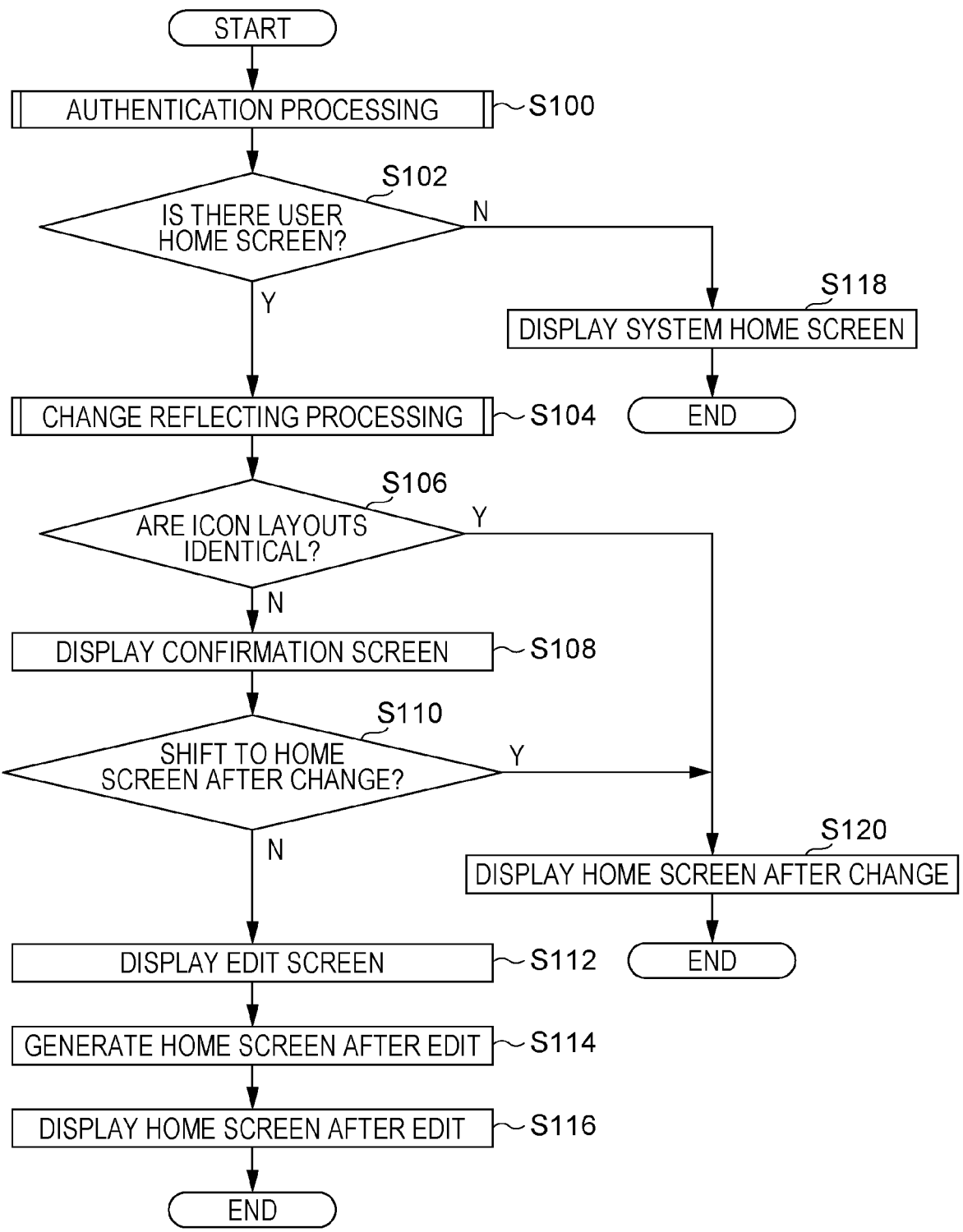
FIG. 9 is a flowchart illustrating an example of a flow of home screen display processing.

FIG. 9 is a flowchart illustrating an example of a flow of the home screen display processing.

First, in step 100, authentication processing is executed. For example, in a case where a user ID and a password acquired from a user match a user ID and a password stored in the user management table (FIG. 12), a login state starts.

Next, in step 102, it is determined whether or not there is a user home screen. In a case where information indicating that display customization has been performed is stored in the user management table (FIG. 12), screen information of a home screen is also stored. In a case where there is a user home screen, step 104 is executed. In a case where there is no user home screen, step 118 is executed. In step 118, a system home screen is displayed on the operation display unit, and then the routine is finished.

Next, in step 104, "change reflecting processing" is executed. In the change reflecting processing, screen information of a "screen after change" reflecting contents of an administrator's change is newly generated. The "change reflecting processing" will be described later.

Next, in step 106, it is determined whether or not an icon layout on the home screen after the change is identical to an icon layout of the user home screen. For example, it is determined that the icon layout on the home screen after the change is identical to the icon layout of the user home screen in a case where the icon layout on the home screen after the change matches the icon layout of the user home screen in terms of the number of icons, kinds of icons, and display positions of icons as a result of comparison between the icon layout on the home screen after the change and the icon layout of the user home screen.

In a case where the icon layout on the home screen after the change is different from the icon layout of the user home screen, step 108 is executed. In a case where the icon layout on the home screen after the change is identical to the icon layout of the user home screen, step 120 is executed. In step 120, the home screen after the change is displayed on the basis of the screen information generated in step 104, and then the routine is finished.

FIG. 15 is a schematic view illustrating an example in which an icon layout is not changed. In the example illustrated in FIG. 15, the function GO and the function SF displayed on the user home screen 400 are deleted. The icon of the deleted function GO and the icon of the deleted function SF are also displayed together with the use prohibition mark Y on the home screen 600 after the change. Furthermore, the icon of the function CO, the icon of the function GO, and the icon of the function SF are pinned at display positions designated by the user. Accordingly, the icon layout on the home screen after the change matches the icon layout of the user home screen in terms of the number of icons, kinds of icons, and display positions of icons.

In the present exemplary embodiment, display of a confirmation screen is omitted in a case where the icon layout on the home screen after the change is identical to the icon layout of the user home screen, but a condition of omission of display of a confirmation screen is not limited to this. Display of a confirmation screen is omitted in a case where a predetermined condition is met. For example, a candidate of an icon to be pinned may be extracted on the information processing apparatus side, and display of a confirmation screen may be omitted in a case where there is no change of a display position of the candidate icon.

Next, in step 108, a confirmation screen is displayed on the operation display unit. By displaying the confirmation screen, the user is notified of the change of the user home screen. Furthermore, the confirmation screen including an image of the home screen after the change is displayed, and thus the user confirms the home screen after the change. The confirmation screen includes a permission button for permitting shift to the home screen after the change and a prohibition button for prohibiting shift to the home screen after the change. User's selection is received by using the permission button and the prohibition button.

Next, in step 110, it is determined whether or not the home screen after the change is displayed on the basis of a result of the user's selection. In a case where the permission button is pressed, the home screen after the change is displayed. In a case where the home screen after the change is displayed, step 120 is executed. In step 120, the home screen after the change is displayed on the operation display unit on the basis of the screen information generated in step 104, and then the routine is finished.

In a case where the prohibition button is pressed, the home screen after the change is not displayed. In a case where the home screen after the change is not displayed, step 112 is performed. Next, in step 112, the edit screen is displayed on the operation display unit. Edit of the home screen after the change is received on the edit screen.

Next, in step 114, when contents of the edit are determined, screen information of the home screen after the edit is generated. The generated screen information is stored in a storage device such as the storage unit 20.

Finally, in step 116, the home screen after the edit is displayed on the operation display unit on the basis of the screen information generated in step 114, and then the routine is finished.

Change Reflecting Processing

The change reflecting processing is described.

Figure 10:
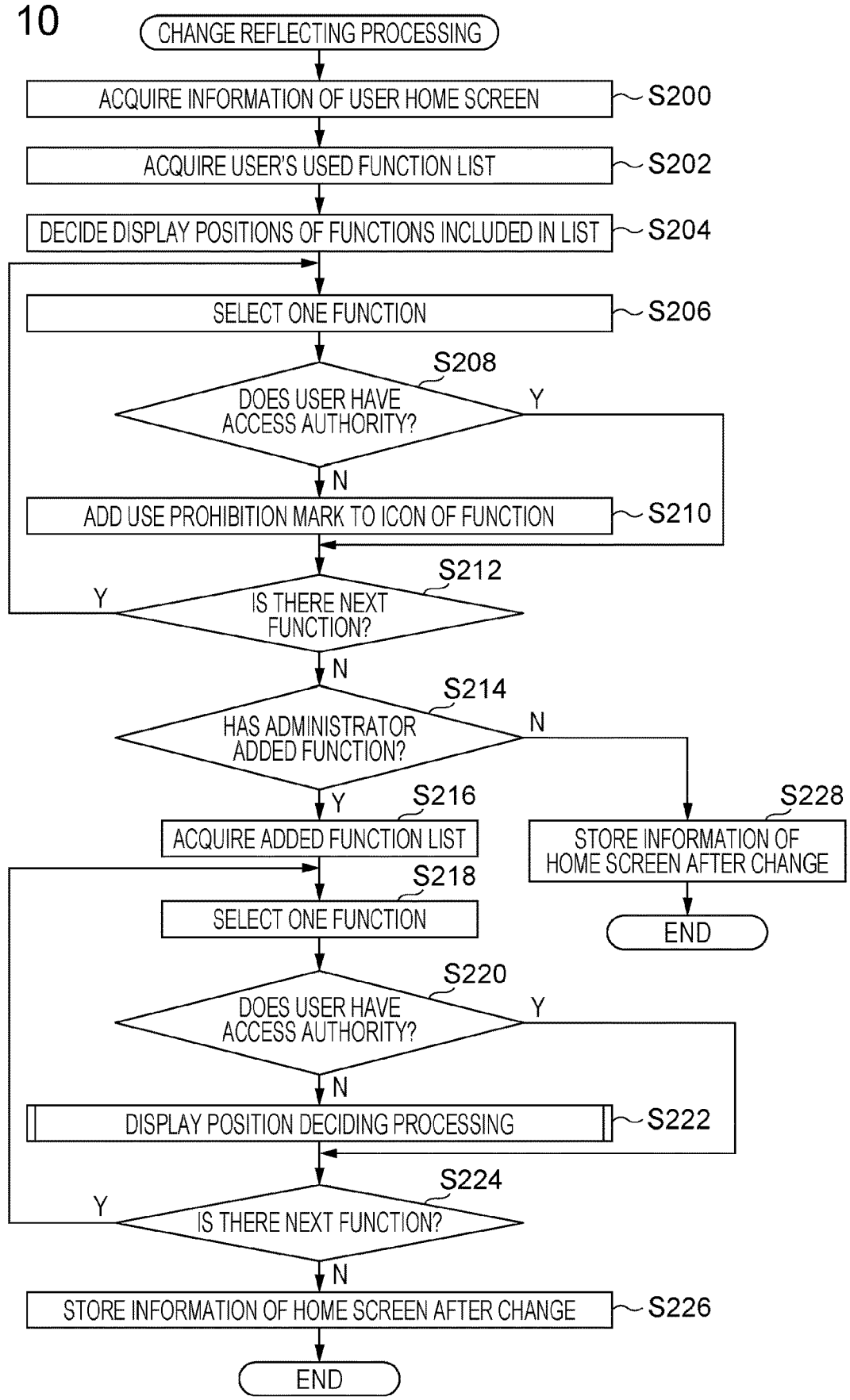
FIG. 10 is a flowchart illustrating an example of a flow of change reflecting processing.

FIG. 10 is a flowchart illustrating an example of a flow of the change reflecting processing.

First, in step 200, screen information of a user home screen is acquired.

Next, in step 202, a list (hereinafter referred to as a "used function list") of functions used by the user is acquired. The used function list is a list of functions displayed on the user home screen. Information concerning the used functions is included in the screen information of the user home screen.

Next, in step 204, display positions of icons of the functions included in the used function list are determined. Information concerning the display positions of the icons is included in the screen information of the user home screen. In this example, the display positions of the icons of the functions included in the used function list are provisionally set to display positions designated by the user. Display positions of icons that are not pinned are changed when a function is added.

Next, in step 206, one of the functions included in the used function list is selected.

Next, in step 208, it is determined whether or not the user has an access authority to the selected function. A user's access authority to each function is managed in the function management table (FIG. 13). In a case where the user does not have the access authority, step 210 is executed. In a case where the user has the access authority, step 210 is skipped, and step 212 is executed.

Next, in step 210, an image of a use prohibition mark is added to an image of the icon of the function to which the user does not have the access authority.

FIG. 16 is a schematic view illustrating an example of a method for displaying a deleted icon. In the example illustrated in FIG. 16, the function GO and the function SF displayed on the body 404 of the user home screen are deleted. The icon of the deleted function GO and the icon of the deleted function SF are also displayed together with the use prohibition mark Y on the body 604 of the home screen after the change.

Next, in step 212, it is determined whether or not there is a "next function" in the used function list. In a case where an access authority is confirmed for all of the functions included in the used function list, there is no next function. In a case where there is a next function, step 206 is executed again. In a case where there is no next function, step 214 is executed.

Next, in step 214, it is determined whether or not the administrator has added a function. Information concerning an added function is included in user information managed in the user management table (FIG. 12). In a case where the administrator has added a function, step 216 is executed. In a case where the administrator has not added a function, step 228 is executed. In step 228, screen information of a "home screen after the change" is generated on the basis of contents of settings decided before and in step 212, the generated screen information is stored, and then the routine is finished.

Next, in step 216, a list (hereinafter referred to as an "added function list") of functions added by the administrator is acquired.

Next, in step 218, one of the functions included in the added function list is selected.

Next, in step 220, it is determined whether or not the user has an access authority to the selected added function. In a case where the user does not have the access authority, step 222 is executed. In a case where the user has the access authority, step 222 is skipped, and step 224 is executed.

Next, in step 222, "display position deciding processing" for deciding a display position of an added function is executed. The "display position deciding processing" will be described later.

Next, in step 224, it is determined whether or not there is a "next function" in the added function list. In a case where there is a next function, step 218 is executed again. In a case where there is no next function, step 226 is executed. In step 226, screen information of a "home screen after the change" is generated on the basis of contents of settings decided before and in step 224, the generated screen information is stored, and then the routine is finished.

Display Position Deciding Processing

The display position deciding processing is described.

Figure 11:
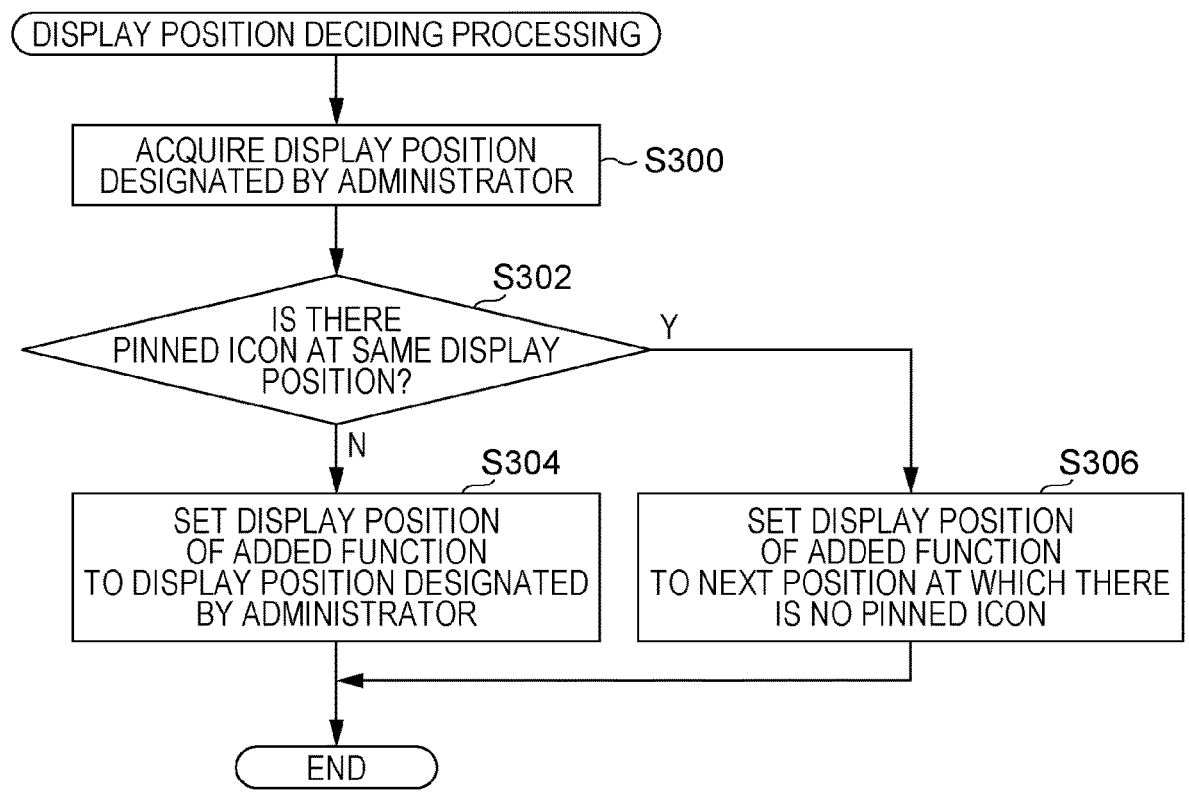
FIG. 11 is a flowchart illustrating an example of a flow of display position deciding processing.

FIG. 11 is a flowchart illustrating an example of a flow of the display position deciding processing.

First, in step 300, a display position designated by the administrator is acquired for the selected added function. A display position designated by the administrator is stored, for an icon of each function, in the function management table (FIG. 13).

Next, in step 302, it is determined whether or not there is an icon pinned by the user at the same display position as the display position designated by the administrator.

In a case where there is no pinned icon, step 304 is executed. Next, in step 304, a setting for displaying the icon of the selected added function at the display position designated by the administrator is made, and then the routine is finished.

In a case where there is a pinned icon, step 306 is executed. Next, in step 306, a setting for displaying the icon of the selected added function at a "next position" at which there is no pinned icon is made, and then the routine is finished.

FIG. 17 is a schematic view illustrating an example of a method for displaying an added icon. In the example illustrated in FIG. 17, a function IDC is added to functions displayed on the body 404 of the user home screen. The icon of the function CO, the icon of the function GO, and the icon of the function SF are pinned at the display positions designated by the user. The icon of the function GO and the icon of the function SF are displayed together with the use prohibition mark Y.

A display position of an icon of the added function IDC has been designated. The display position designated by the administrator is No. 2. At the display position No. 2, there is no pinned icon. The icon of the added function IDC is displayed at the display position No. 2. Display positions of icons of a function ADB, a function USB, a function DVC, and a function JB that are not pinned are shifted to display positions next to and following these display positions.

Meanwhile, in a case where there is a pinned icon at the display position No. 2, the icon of the added function IDC is displayed at a "next position" at which there is no pinned icon. In this example, there is no pinned icon at a display position No. 5. The icon of the added function IDC is displayed at the display position No. 5.

In a case where the display position of the icon of the function IDC has not been designated, the icon of the added function IDC is displayed at a rearmost display position. For example, a display position "0" in the function management table (FIG. 13) indicates that a display position has not been designated. In this case, the display positions of the icons of the function ADB, the function USB, the function DVC, and the function JB are not shifted.

Although an example in which an icon of an added function is displayed at a "next position" in a case where there is a pinned icon at a display position designated by the administrator is described in the present exemplary embodiment, the icon of the added function need just be displayed at another position at which there is no pinned icon. For example, the icon of the added function may be displayed at a "rearmost" display position.

MODIFICATIONS

The configurations of the information processing apparatus and the program described in the above exemplary embodiment are merely examples and can be changed without departing from the spirit of the present disclosure.

Although a case where the home screen display processing is realized by software has been described in the above exemplary embodiment, similar processing may be realized by hardware.

Although an example in which an image forming apparatus is used as the information processing apparatus has been described in the present exemplary embodiment, a mobile terminal, such as a smartphone, having an authentication function may be used as the information processing apparatus.

Although an example in which a user home screen is changed by the administrator of the information processing apparatus has been described in the present exemplary embodiment, the present disclosure is similarly applicable to a case where the information processing apparatus automatically changes a user home screen.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus that performs display control for receiving edit of a display screen on which at least one image representing a function is displayed and causing a user display screen edited by an authorized user to be displayed on an operation display unit, comprising:
   a first controller that, in a case where the user display screen is changed by an entity other than the user, performs display control for displaying a receiving screen that includes a picture of a display screen after the change displayed as a pre-view and a selection part, the selection part comprising:
      a permission button for selecting to permit shift to the display screen after the change,
      a prohibition button for selecting to prohibit shift to the display screen after the change,
      and receives user's selection; and
   a second controller that, in a case where the user selects prohibition of shift to the display screen after the change by pressing the prohibition button, performs display control for shifting the receiving screen to an edit screen for editing the display screen after the change,
   wherein in a case where the user selects permission of shift to the display screen after the change by pressing the permission button, the second controller performs display control for shifting the receiving screen to the display screen after the change.

2. The information processing apparatus according to claim 1, wherein
   the first controller performs the display control for displaying the receiving screen in a case where a kind of image representing a function displayed on the user display screen, a number of images representing a function displayed on the user display screen, and/or a display position of an image representing a function displayed on the user display screen are changed.

3. The information processing apparatus according to claim 2, wherein
   the receiving screen includes a message notifying the user about the change of the user display screen.

4. The information processing apparatus according to claim 1, wherein
   the first controller performs the display control for displaying the receiving screen in a case where a kind of image representing a function displayed on the user display screen, a number of images representing a function displayed on the user display screen, and/or a display position of an image representing a function displayed on the user display screen are changed.

5. The information processing apparatus according to claim 4, wherein
   the receiving screen includes a message notifying the user about the change of the user display screen.

6. The information processing apparatus according to claim 1, wherein the receiving screen includes a message notifying the user about the change of the user display screen.

7. The information processing apparatus according to claim 1, wherein
   the receiving screen includes a message notifying the user about the change of the user display screen.

8. The information processing apparatus according to claim 1, wherein
   the picture of the display screen after the change displayed as a pre-view within the receiving screen is displayed in a manner different from the display screen after the change.

9. The information processing apparatus according to claim 8, wherein
   the picture of the display screen after the change displayed as a pre-view is a reduced picture of a whole or a part of the display screen after the change.

10. The information processing apparatus according to claim 9, wherein
    the picture of the display screen after the change displayed as a pre-view is displayed within a frame.

11. The information processing apparatus according to claim 8, wherein
    the picture of the display screen after the change displayed as a pre-view is displayed within a frame.

12. The information processing apparatus according to claim 1, wherein
    the display screen after the change is displayed in a manner such that an image of a deleted function is unavailable.

13. The information processing apparatus according to claim 12, wherein
    an image representing prohibition of use is superimposed on the image of the deleted function.

14. The information processing apparatus according to claim 1, wherein
    a display position of an image of at least one function is fixed.

15. The information processing apparatus according to claim 14, wherein
    the display position of the image of the at least one function is fixed by user's editing.

16. The information processing apparatus according to claim 15, wherein
    an image of an added function is displayed at a display position at which there is no image of another function whose display position is fixed.

17. The information processing apparatus according to claim 14, wherein
    an image of an added function is displayed at a display position at which there is no image of another function whose display position is fixed.

18. A non-transitory computer readable medium storing a program causing a computer to function as each unit of the information processing apparatus according to claim 1.

* * * * *